(12) United States Patent
Klews et al.

(10) Patent No.: US 11,247,666 B2
(45) Date of Patent: Feb. 15, 2022

(54) METHOD AND DEVICE FOR DAMPING A LATERAL PENDULAR MOTION OF A SINGLE-TRACK MOTOR VEHICLE

(71) Applicant: Robert Bosch GmbH, Stuttgart (DE)

(72) Inventors: Matthias Klews, Tübingen (DE); Markus Henzler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 16/315,416

(22) PCT Filed: May 4, 2017

(86) PCT No.: PCT/EP2017/060645
§ 371 (c)(1),
(2) Date: Jan. 4, 2019

(87) PCT Pub. No.: WO2018/007041
PCT Pub. Date: Jan. 11, 2018

(65) Prior Publication Data
US 2019/0308610 A1    Oct. 10, 2019

(30) Foreign Application Priority Data

Jul. 6, 2016   (DE) .......................... 102016212276.2

(51) Int. Cl.
*F16F 15/36* (2006.01)
*B60W 30/02* (2012.01)
(Continued)

(52) U.S. Cl.
CPC .............. *B60W 30/02* (2013.01); *B62J 27/00* (2013.01); *F16F 15/315* (2013.01); *F16F 15/36* (2013.01); *B60W 2300/36* (2013.01); *B60W 2520/125* (2013.01); *B60W 2520/14* (2013.01); *F16F 2222/08* (2013.01); *F16F 2230/0011* (2013.01); *F16F 2230/18* (2013.01)

(58) Field of Classification Search
CPC ........ F16F 15/36; F16F 15/326; F16F 15/315; F16F 2222/08; F16F 2230/18; F16F 2230/0011
USPC .................................................. 188/378–380
See application file for complete search history.

(56) References Cited

U.S. PATENT DOCUMENTS

| | | | | |
|---|---|---|---|---|
| 131,782 A | * | 10/1872 | Randall ..................... | F16C 3/28 74/571.11 |
| 2,269,670 A | * | 1/1942 | Kieckbusch .......... | F16F 15/326 301/5.21 |

(Continued)

FOREIGN PATENT DOCUMENTS

| CN | 101282862 A | 10/2008 |
|---|---|---|
| CN | 101588959 A | 11/2009 |

(Continued)

OTHER PUBLICATIONS

International Search Report for PCT/EP2017/060645, dated Jul. 10, 2017.

*Primary Examiner* — Xuan Lan Nguyen
(74) *Attorney, Agent, or Firm* — Norton Rose Fulbright US LLP; Gerard Messina

(57) ABSTRACT

A method for damping a lateral pendular motion of a single-track motor vehicle having a front wheel, where—the presence of a pendular motion is ascertained, and—the moment of inertia of the front wheel is increased as a function of it.

7 Claims, 1 Drawing Sheet

(51) Int. Cl.
*B62J 27/00* (2020.01)
*F16F 15/315* (2006.01)

(56) References Cited

U.S. PATENT DOCUMENTS

| | | | | |
|---|---|---|---|---|
| 3,314,503 | A * | 4/1967 | Neubert | F16F 15/10 |
| | | | | 188/379 |
| 3,440,678 | A | 4/1969 | Tibbet | |
| 4,530,239 | A * | 7/1985 | Scarinci | G01M 1/04 |
| | | | | 73/455 |
| 5,099,430 | A * | 3/1992 | Hirsch | F16F 15/31 |
| | | | | 464/180 |
| 7,267,410 | B2 * | 9/2007 | Ito | F16F 15/326 |
| | | | | 301/37.41 |
| 9,381,785 | B2 | 7/2016 | Gale | |
| 10,731,466 | B2 * | 8/2020 | Mochi | F01D 5/027 |
| 2008/0174166 | A1 | 7/2008 | Kalil | |
| 2011/0109150 | A1 * | 5/2011 | Mcculloch | F16F 15/326 |
| | | | | 301/5.21 |
| 2011/0163516 | A1 | 7/2011 | Whinnery | |
| 2014/0262581 | A1 | 9/2014 | Whinnery | |

FOREIGN PATENT DOCUMENTS

| | | |
|---|---|---|
| CN | 104512380 A | 4/2015 |
| CN | 104943660 A | 9/2015 |
| CN | 104955686 A | 9/2015 |
| DE | 3639537 A1 | 6/1988 |
| DE | 102005047142 A1 | 4/2007 |
| DE | 102006050721 A1 | 4/2007 |
| DE | 102008011575 A1 | 9/2008 |
| DE | 102012224474 A1 | 7/2014 |
| DE | 102013200020 A1 | 7/2014 |
| EP | 330458 A2 | 8/1989 |
| KR | 20120039819 A | 4/2012 |
| WO | 2004026649 A1 | 4/2004 |

* cited by examiner

METHOD AND DEVICE FOR DAMPING A LATERAL PENDULAR MOTION OF A SINGLE-TRACK MOTOR VEHICLE

BACKGROUND INFORMATION

A pendular motion is understood as a natural oscillation of two-wheeled vehicles, which is made up of out-of-phase angular motion of the frame and of the steering system. This oscillation mode typically has a frequency of approximately 2.5-5 Hz. The amplitude of this oscillation is a function of many factors. In the case of motorcycles, the pendulation may become noticeable, in particular, at high speeds and, in particular, during straight-line travel, induced by external disturbances, such as roadway roughness or air turbulence. The pendulation may build up very rapidly and result in uncontrolled operating behavior. Since the motional actions of the rider are normally limited to maximum frequencies of 1-2 Hz, he/she is scarcely able to counteract the oscillation in a deliberate manner.

German Published Patent Application No. 10 2008 011 575 describes a method for eliminating or reducing a pendular motion of a single-track motor vehicle; at least a roll angle and/or a roll rate of the vehicle being determined, the roll angle and/or the roll rate being analyzed in order to detect the pendular motion of the vehicle, and in response to the detection of an occurrence of a pendular vehicle motion, regulation of the brake pressure at at least one wheel and/or regulation of a drive torque being carried out.

SUMMARY

The present invention relates to a method for damping a lateral pendular motion of a single-track motor vehicle having a front wheel, where
the presence of a pendular motion is ascertained; and
the moment of inertia of the front wheel is increased as a function of it.

In this manner, the pendular motion is damped effectively. In addition to the front wheel, the single-track motor vehicle has, in particular, a rear wheel, as well; the damping measures being carried out at the front wheel.

One advantageous refinement of the present invention is characterized in that the presence of a lateral pendular motion is detected with the aid of the output signals of a transverse acceleration sensor and/or of a yaw rate sensor. In general, such sensors are already installed as standard equipment in modern, single-track motor vehicles, such as motorcycles.

One advantageous refinement of the present invention is characterized in that the moment of inertia of the front wheel is increased by moving at least one weight attached to the front wheel in the radial direction pointing towards the outside of the wheel. In particular, there is, however, a plurality of weights, which are attached azimuthally at regular angular intervals and are each moved radially outwards.

One advantageous refinement of the present invention is characterized in that the weight is moved outwards along a spoke of the front wheel. In this connection, the spoke may be used for mechanical guidance of the weight.

One advantageous refinement of the present invention is characterized in that after the pendular motion of the motor vehicle is damped, the weight is brought back to the original position by a screw or a cable line.

One advantageous refinement of the present invention is characterized in that the moment of inertia of the front wheel is increased by joining at least one disk to the front wheel in a force-locked manner, so that it rotates with it, the disk being attached to the frame of the motor vehicle in a direction parallel to the front wheel and not rotating with the front wheel in the initial state.

One advantageous refinement of the present invention is characterized in that the non-rotating disk is joined to the front wheel in the force-locked manner with the aid of a coupling.

In addition, the present invention includes an apparatus having devices, which are configured to implement the methods according to the present invention. In particular, it is a control unit, in which the program code for implementing the method of the present invention is stored.

DETAILED DESCRIPTION

Figure 1:
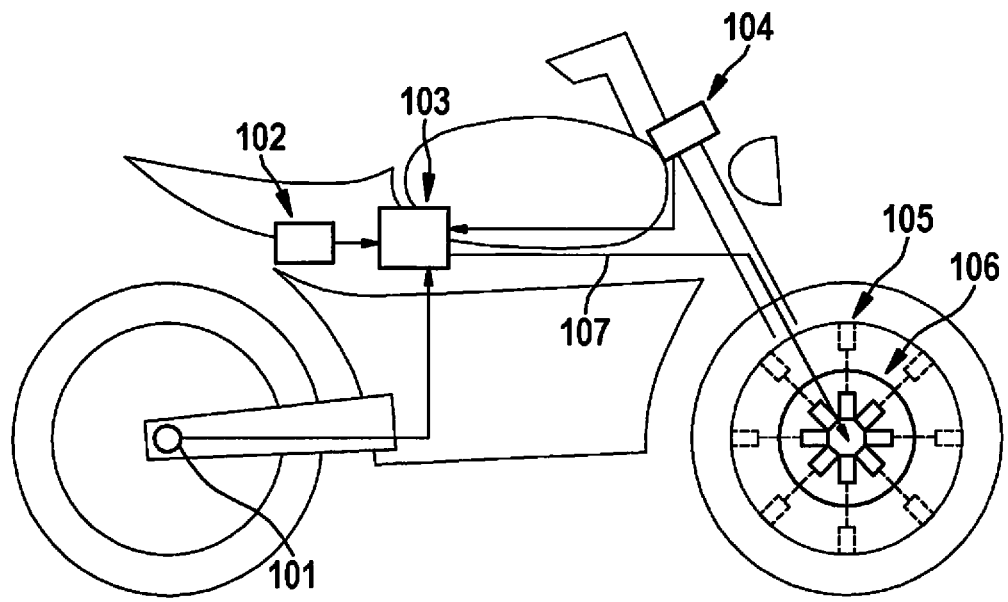
FIG. 1 shows the side view of a motorcycle.

If a pendular motion of a motorized two-wheeled vehicle assumes a critical degree, this condition is detected by sensors, which sense the movement of the frame and/or of the steering system. As a result, the moment of inertia of the front wheel is increased by a mechanical device, by displacing available weights or attaching additional weights to the front wheel; the increase in the moment of inertia having a damping effect on the pendular event. After the pendulation decays, the original state is restored. This procedure may also stabilize the pendulation of motorized two-wheeled vehicles, which are equipped with, as well as not equipped with, a steering damper.

An inertial sensor, which is able to measure the transverse acceleration and/or the yaw rate, is mounted to the motorcycle frame. The pendulation may be detected via typical patterns of these sensor variables. The reliability of this sensing may be increased by mounting an additional inertial sensor on the steering system, in order to measure the yaw rate about the vertical axis. The yaw rate of the steering system may also be ascertained by a steering angle sensor, e.g., a linear potentiometer, whose output signal indicating the steering angle is obtained by differentiating the yaw rate of the steering system with respect to time. The output signals of the sensor system are examined by an algorithm for typical patterns of the pendulation situation, e.g., oscillations at the frequencies typical of pendular motion and/or phase shifts between the yaw rate oscillations of the frame and the wheel fork. The pendulation typically occurs at high speeds >130 km/h; therefore, the wheel speed ascertained with the aid of a wheel speed sensor may be used. The algorithm may be implemented, for example, in an ABS control unit. The moment of inertia of the front wheel is increased after a pendulation situation is detected. This may be accomplished, for example, using additional weights or weights movable in the radial direction of the outside of the wheel. The weights are initially situated in the vicinity of the wheel bearing. In response to an occurring tendency of the motorcycle to pendulate, the weights are moved in the direction of the rim. This movement towards the rim, which is necessary for stabilization, may be achieved by the centrifugal force. In order to move the weights back, electrically operated screws or cable lines are conceivable, which, after the stabilization, pull the weights back again via operation of a motor. A voltage supply at the wheel and a signal line to the rotating wheel are necessary for this. A wireless radio link may also be provided in place of the signal line. In addition to stabilizing pendular motion, the weights may also be used for automatic correction of wheel imbalance, if the individual weights are able to be controlled singly or individually.

Another option for increasing the moment of inertia of the front wheel is to attach one or more rotatable disks in parallel with the front wheel. During a stable ride, these disks are kept in a resting state. This may be accomplished, for example, using a friction brake. When pendulation occurs, the disks are joined to the front wheel with the aid of a coupling device, e.g., a friction clutch, and rotate at the speed of the front wheel. The coupling must occur in a sufficiently smooth manner, so that the front wheel is not decelerated in an overly sharp manner by the rapidly increasing moment of inertia. After the pendular motion situation dies away, the disks are uncoupled again and decelerated gently.

In the two variants described, the overall mass of the steering system always remains constant.

The side view of a motorcycle is depicted in FIG. 1. In this context, numeral 101 denotes the wheel speed sensor of the rear wheel, and numeral 102 denotes the inertial sensor system, which is installed on the motorcycle and measures, in particular, the accelerations in different spatial directions, as well as the rotational speeds or angular speeds about different space axes. Numeral 104 denotes the steering angle sensor. The output signals of sensors 101, 102 and 104 are supplied to a control unit 103, and as a function of these, it is determined whether or not a lateral pendular motion of the motorcycle is present. In response to the presence of a pendular motion, an actuator system at the front wheel is triggered, the actuator system moving at least one weight 105 radially in the direction pointing towards the outside of the wheel or joining at least one disk 106 to the front wheel in a force-locked manner; the disk being attached to the frame of the motor vehicle in a direction parallel to the front wheel and not rotating in the initial state. A wireless radio link may also be used, for example, in place of control line 107.

Figure 2:
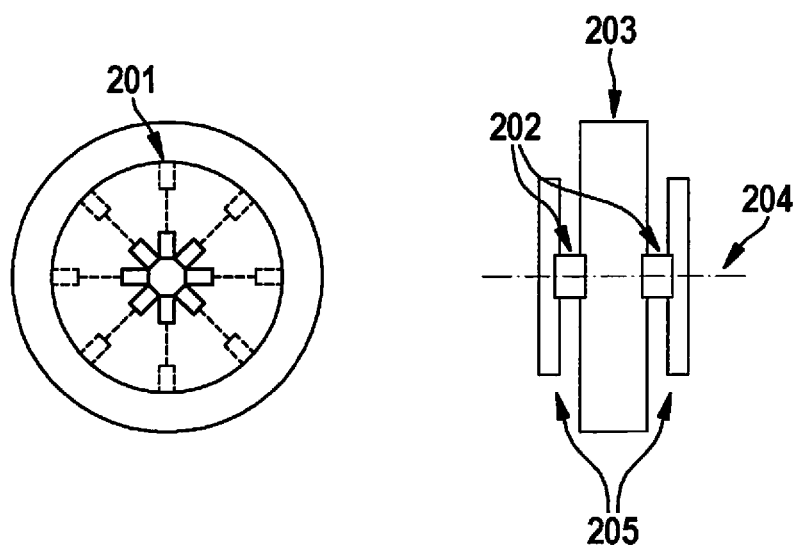
FIG. 2 shows the side view of a wheel including the radially displaceable weights. The front view of a wheel having the disk weights capable of being coupled is represented on the right.

In FIG. 2, a side view of the front wheel of a motorcycle is depicted in the illustration on the left. Numeral 201 denotes the movable weights, which are displaced, e.g., by electrically operated screws or cable lines in response to the presence of a pendular motion.

The front view of the front wheel of a motorcycle is depicted in the illustration on the right side of FIG. 2. Front wheel 203, its axis of rotation 204, disk weights 205 and coupling device 202 are drawn in. Disk weights 205 remain motionless during normal operation and rotate with the front wheel in response to the presence of a pendular motion.

What is claimed is:

1. A method for damping a lateral pendular motion of a single-track motor vehicle having a front wheel, comprising:
    ascertaining a presence of a pendular motion while the front wheel moves according to a rotational speed; and
    increasing, while the front wheel moves according to the rotational speed, a moment of inertia of the front wheel as a function of the pendular motion, wherein:
        the moment of inertia of the front wheel is increased by joining at least one disk to the front wheel in a force-locked manner, so that the disk rotates with the front wheel,
        the disk is attached to a frame of the motor vehicle in a direction parallel to the front wheel, and
        the disk does not rotate with the front wheel in an initial non-rotating state.

2. The method as recited in claim 1, further comprising:
    detecting a presence of a lateral pendular motion via at least one of an output signal of a transverse acceleration sensor and an output signal of a yaw rate sensor.

3. The method as recited in claim 2, wherein the moment of inertia of the front wheel is increased by moving at least one weight attached to the front wheel in a radial direction pointing towards an outside of the wheel.

4. The method as recited in claim 3, wherein the weight is moved outwards along a spoke of the front wheel.

5. The method as recited in claim 4, further comprising:
    after the pendular motion of the motor vehicle is damped, bringing back the weight to an original position by one of a screw and a cable line.

6. The method as recited in claim 1, wherein the disk is the non-rotating state is joined by a coupling to the front wheel in the force-locked manner.

7. An apparatus for damping a lateral pendular motion of a single-track motor vehicle having a front wheel, comprising:
    an arrangement for ascertaining a presence of a pendular motion while the front wheel moves according to a rotational speed; and
    an arrangement for increasing, while the front wheel moves according to the rotational speed, a moment of inertia of the front wheel as a function of the pendular motion, wherein:
        the moment of inertia of the front wheel is increased by joining at least one disk to the front wheel in a force-locked manner, so that the disk rotates with the front wheel,
        the disk is attached to a frame of the motor vehicle in a direction parallel to the front wheel, and
        the disk does not rotate with the front wheel in an initial non-rotating state.

\* \* \* \* \*